United States Patent [19]
Easton

[11] Patent Number: 5,871,074
[45] Date of Patent: Feb. 16, 1999

[54] CONTROL CIRCUIT FOR A POWERSHIFT TRANSMISSION

[75] Inventor: David Joseph Easton, Cedar Falls, Iowa

[73] Assignee: Deere & Company, Moline, Ill.

[21] Appl. No.: 923,565

[22] Filed: Sep. 4, 1997

[51] Int. Cl.[6] .............................. F16D 25/10; F16D 48/06
[52] U.S. Cl. .................................. 192/87.13; 192/109 F; 74/335
[58] Field of Search ................................ 192/3.58, 87.13, 192/109 F; 74/335

[56] References Cited

U.S. PATENT DOCUMENTS

| | | | |
|---|---|---|---|
| 5,168,973 | 12/1992 | Asayama et al. | 192/109 F X |
| 5,179,874 | 1/1993 | Hunter | 192/87.13 X |
| 5,449,330 | 9/1995 | Paulsen. | |

Primary Examiner—Richard M. Lorence

[57] ABSTRACT

A powershift transmission includes a plurality of hydraulically operated clutch packs which are selectively engaged and disengaged to enable various gear ratios. A control circuit for such a transmission includes a system pressure source, a fluid reservoir, a control gallery, a plurality of control valves and a plurality of latching valves. Each control valve and each latching valve is connected with a corresponding one of the clutch packs, and is communicated with each other, with the system pressure source, with the reservoir and with the control gallery. The control valves, latching valves and the control gallery cooperate to prevent pressurization of any one of the clutch packs before all the clutch packs are filled with hydraulic fluid. The control valves and the latching valves also cooperate to maintain disengaged clutch packs at reservoir pressure, and to maintain engaged clutch packs at system pressure.

8 Claims, 1 Drawing Sheet

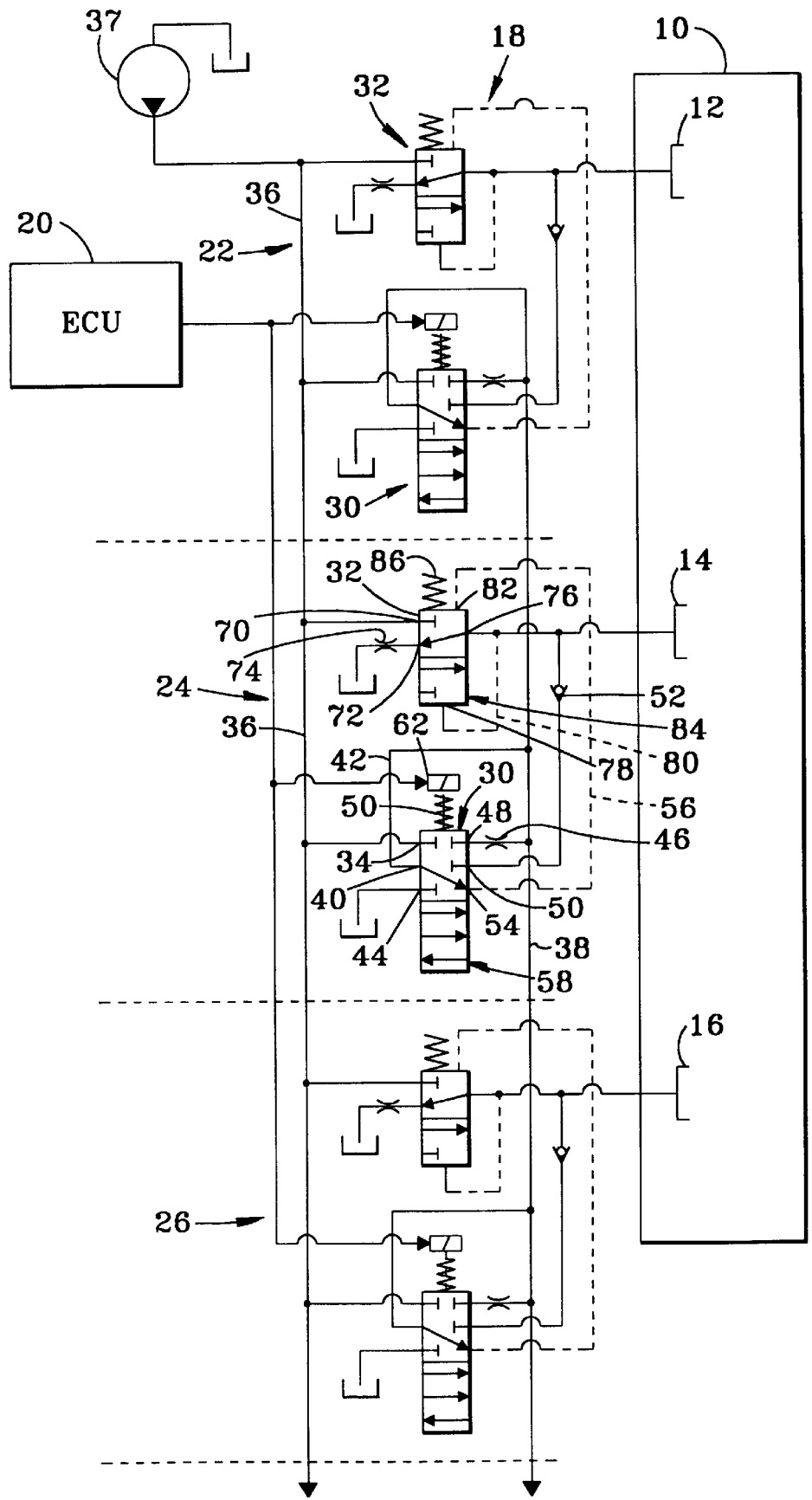

CONTROL CIRCUIT FOR A POWERSHIFT TRANSMISSION

BACKGROUND OF THE INVENTION

The invention relates to an electro-hydraulic control circuit for an electronically controlled powershift transmission.

Microprocessor-based electronic controllers for powershift transmissions make possible features which are not otherwise practical. However, it is difficult to achieve quality shifts with an electronically controlled transmission. Because coordination of multiple elements is difficult, electronically controlled powershift transmissions have required substantial, time consuming and expensive fine tuning in order to achieve satisfactory overall shift quality. This is because the microprocessor or hydraulic valving which controls the transmission does not receive sufficient information (feedback) about what is actually going on inside the transmission.

In an electronic microprocessor-based control system for a powershift transmission, the microprocessor generates time-based electrical signals with extreme accuracy and repeatability, but the hydraulically operated transmission components respond directly only to hydraulic pressures generated by valves which are controlled by the electronics. The electrical signals are adjusted to generate, after some series of events, the correct pressure outputs for one shift condition, but any change in temperature, air/oil mixtures, seal drag, valve gain, engine speed, or dozens of other variables will modify the hydraulic pressures which are generated, perhaps resulting in a rough shift. Control systems are available wherein the electronic controller is supplied with electronic signals corresponding to such variables. However, such systems have not been able to provide quality shifts under all circumstances. Using electronic feedback for parameters, such as clutch piston position, actual pressure on the piston, actual force on clutch discs, to solve this problem is impractical because of cost and complexity. Accordingly, it would be desirable to have a control system which achieves satisfactory shifts and which does not require extensive electronic variable sensing and which does not require electronic sensing of such feedback parameters.

SUMMARY OF THE INVENTION

Accordingly, an object of this invention is to provide a control circuit for an electronically controlled, hydraulically operated powershift transmission which achieves satisfactory shifts and which does not require extensive electronic compensation for variables and which does not require electronic sensing of feedback parameters.

This and other objects are achieved by the present invention, wherein a control circuit is provided for a powershift transmission having a plurality of hydraulically operated clutch packs which are selectively engaged and disengaged to enable various gear ratios. The control circuit includes a system pressure source, a fluid reservoir and a control gallery. The control circuit also includes a plurality of solenoid operated control valves, each control valve being connected with a corresponding one of the clutch packs, and a plurality of latching valves, each latching valve being connected with a corresponding one of the clutch packs. Each control valve is communicated with the system pressure source, with the reservoir and with the control gallery, and each control valve controls communication between the system pressure source and the control gallery, controls communication between the control gallery and the corresponding clutch pack, and controls communication between the latching valve, the reservoir and the control gallery. Each latching valve controls fluid communication between the corresponding clutch pack, the system pressure source and the reservoir, the latching valve being responsive to fluid pressure in the corresponding clutch pack and to fluid pressure communicated to it by the corresponding control valve. The latching valves and the control gallery cooperate to prevent pressurization of any one of the clutch packs before all the clutch packs are filled with hydraulic fluid. The control valves and the latching valves also cooperate to maintain disengaged clutch packs at reservoir pressure, and to maintain engaged clutch packs at system pressure

BRIEF DESCRIPTION OF THE DRAWINGS

The sole FIGURE is a schematic diagram of a powershift transmission control system including the control circuit of the present invention.

DETAILED DESCRIPTION

Referring to the FIGURE, a power shift transmission 10 includes a plurality of clutch packs (three of which are shown for purposes of illustration) 12, 14 and 16 which are controlled by an electro-hydraulic control circuit 18 to engage and disengage various gear ratios. The control circuit 18 is controlled by signals from an electronic control unit (ECU) 20, such as a microprocessor-based control unit. The transmission 10 may be a commercially available powershift transmission with a separate traction clutch, or with selected internal clutches used as a traction clutch.

The control circuit 18 includes a plurality of valve units 22, 24, 26, one for each clutch pack. Valve unit 24 includes a solenoid operated control valve 30 and a latching valve 32. The control valve 30 includes a first port 34 communicated to a pressure gallery 36 which is supplied with system pressure from a pump 37. A control gallery 38 is connected to a second port 40 via line 42. A third port 44 is connected to a sump or reservoir. Control gallery 38 is connected via a restriction 46 to a fourth port 48 of each control valve. A fifth port 50 is connected to the associated clutch 14 pack via check valve 52 which permits one-way fluid flow from port 50 to the clutch pack 14. A sixth port 54 is communicated with a port of latching valve 32 via sense line 56. Valve 30 includes a spool 58 which is biased by spring 60 to a first position wherein ports 34, 44, 48 and 50 are blocked and wherein port 40 is communicated with port 54. A solenoid 62 is energizable to move spool 58 to a second position wherein port 34 is communicated with port 48, port 40 is communicated with port 50 and port 54 is communicated with port 44.

Latching valve 32 includes a first port 70 connected to pressure gallery 36, a second port 72 connected to sump via restriction 74, a third port 76 connected to the clutch pack 14 and to a fourth port 78 connected to the clutch pack 14 via sense line 80, and a fifth port 82 connected via sense line 56 to port 54 of valve 30. Thus, clutch pack pressure is fed back to port 78 via line 80. Latching valve 32 includes a spool 84 which is biased by spring 86 to a first position wherein port 70 is blocked and wherein port 76 is communicated with port 72. The spool 84 is movable in response to pressure at port 78 to a second position wherein port 72 is blocked and port 70 is communicated with port 76 so that system pressure is communicated to the clutch pack 14.

Operation

Pressure gallery 36 feeds pressure regulated hydraulic fluid from pump 37 to the control valve 30 and the latching valve 32 of each of the valve units 22–26 for each clutch pack 12–16. The pressure feedback communicated by line 80 to port 78 of each latching valve 32 will keep any disengaged (unpressurized) clutch pack at sump pressure, and will keep any engaged (pressurized) clutch pack at system pressure. When a shift is to be made, the ECU 20 simultaneously energizes the solenoids 62 for all of the control valves 30 corresponding to the clutch packs required to be pressurized and engaged for the new commanded gear. These energized control valves 30 move into their second positions described above, and pressurized fluid is communicated from pressure gallery 36 into the control gallery 38 via ports 34 and 48, and fluid is communicated from the control gallery 38 to each respective clutch pack via ports 40 and 50 and check valve 52. Thus, fluid will flow into the clutch packs, first filling one and then filling others. The control gallery 38 equalizes the pressure among all clutch packs being filled, so that none are fully pressurized before all are filled. When all the clutch packs are filled and there is no additional volume to fill, the pressure in the control gallery 38 and all the selected clutch packs quickly increases and all the selected clutch packs begin engaging and carrying torque.

Since the solenoids 62 of the control valves 30 corresponding to the clutch packs which are not required for the new gear are not energized, the de-energized control valves 30 communicate fluid from the control gallery 38 via ports 40 and 54 and line 56 to port 82 of the corresponding latching valve 32. For each clutch pack which is being disengaged, the quickly rising pressure at port 82 balances the clutch pack pressure at port 78 on the other end of the spool 84 and the spring 86 moves the latching valve into its first position, wherein the corresponding clutch pack is communicated to sump via ports 76 and 72, thus disengaging the corresponding clutch pack. For each clutch pack which was already disengaged, the control gallery pressure at port 82 of the corresponding latching valve 32 does nothing, because that latching valve is already in its first position. Once the shift is completed, the solenoids 62 are turned off, and each clutch pack is maintained appropriately pressurized or de-pressurized by the corresponding latching valve 32. Thus, the coordination of the oncoming and offgoing clutches is controlled hydraulically with hydraulic feedback, and the ECU 20 need only select which clutch packs are to be engaged and disengaged. Since a hydraulic feedback pressure is communicated to the latching valves, offgoing clutch packs do not disengage until all oncoming clutch packs are ready to carry torque, even if that should take several seconds. Once all clutch packs are filled and ready, the shift occurs very quickly, with no torque dropout because only a small amount of additional fluid is required.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A control circuit for a powershift transmission having a plurality of hydraulically operated clutch packs which are selectively engaged and disengaged to enable various gear ratios, the control circuit comprising:

a system pressure source;
a fluid reservoir;
a control gallery;
a plurality of control valves, each control valve being connected with a corresponding one of the clutch packs;
a plurality of latching valves, each latching valve being connected with a corresponding one of the clutch packs;
each control valve being communicated with the system pressure source, with the reservoir and with the control gallery, each control valve controlling communication between the system pressure source and the control gallery, controlling communication between the control gallery and the corresponding clutch pack, and controlling communication between the latching valve, the reservoir and the control gallery; and
each latching valve controlling fluid communication between the corresponding clutch pack, the system pressure source and the reservoir, the latching valve being responsive to fluid pressure in the corresponding clutch pack and to fluid pressure communicated to it by the corresponding control valve; the control valves, the latching valves and the control gallery cooperating to prevent pressurization of any one of the plurality of clutch packs before all the clutch packs are filled with hydraulic fluid.

2. The control circuit of claim 1, wherein:

the control valves and the latching valves cooperate to maintain disengaged clutch packs at reservoir pressure, to maintain engaged clutch packs at system pressure.

3. The control circuit of claim 1, wherein:

each latching valve connected to a disengaged clutch pack is held in a position by a pressure signal from the corresponding control valve wherein the latching valve communicates the disengaged clutch pack with the reservoir; and
each latching valve connected to an engaged clutch pack is held in a position by a pressure signal from the control valve wherein the latching valve communicates the engaged clutch pack with the system pressure source.

4. The control circuit of claim 1, wherein the control valve comprises:

a first port communicated to the system pressure source;
a second port communicated with the control gallery;
a third port communicated with the reservoir;
a fourth port communicated with the control gallery via a restriction;
a fifth port communicated with the corresponding clutch pack;
a sixth port communicated with the corresponding latching valve;
a spool biased movable to a first position wherein the first, third, fourth and fifth ports are blocked and wherein the second port is communicated with the sixth port, and movable to a second position wherein the first port is communicated with the fourth port, second port is communicated with fifth port and the sixth port is communicated with the third port;
a spring biased to urge the control valve spool to its first position; and
a solenoid operable to move the control valve spool to its second position.

5. The control circuit of claim 4, wherein:

the fifth port is connected to the corresponding clutch pack via a check valve which permits one-way fluid flow from the fifth port to the clutch pack.

6. The control circuit of claim 1, wherein the latching valve comprises:
- a first port connected to the system pressure source;
- a second port connected to the reservoir via restriction;
- a third port connected to the corresponding clutch pack;
- a fourth port communicated with the corresponding clutch pack;
- a fifth port connected to the corresponding control valve;
- a spool movable to a first position wherein the first port is blocked and the third port is communicated with the second port, and movable to a second position wherein the first port is communicated with the third port and the second port is blocked; and
- a spring biased to urge the spool to its first position, and the spool being movable to the second position in response to fluid pressure in the fourth port.

7. The control circuit of claim 6, wherein:
the second port is connected to the reservoir via a restriction.

8. The control circuit of claim 1, wherein:
the control valve comprises:
- a first port communicated to the system pressure source;
- a second port communicated with the control gallery;
- a third port communicated with the reservoir;
- a fourth port communicated with the control gallery via a restriction;
- a fifth port communicated with the corresponding clutch pack via a check valve;
- a sixth port communicated with the latching valve;
- a control valve spool biased movable to a first position wherein the first, third, fourth and fifth ports are blocked and wherein the second port is communicated with the sixth port, and movable to a second position wherein the first port is communicated with the fourth port, second port is communicated with fifth port and the sixth port is communicated with the third port;
- a spring biased to urge the control valve spool to its first position; and
- a solenoid operable to move the control valve spool to its second position; and the latching valve comprises:
- a first port connected to the system pressure source;
- a second port connected to the reservoir via restriction;
- a third port connected to the corresponding clutch pack;
- a fourth port communicated with the corresponding clutch pack;
- a fifth port connected to the corresponding control valve;
- a latching valve spool movable in response to fluid pressure in its fourth and fifth ports to a first position wherein the first port is blocked and the third port is communicated with the second port, and movable to a second position wherein the first port is communicated with the third port and the second port is blocked; and
- a spring biased to urge the latching valve spool to its first position.

* * * * *

UNITED STATES PATENT AND TRADEMARK OFFICE
CERTIFICATE OF CORRECTION

PATENT NO. : 5,871,074
DATED : 16 February 1999
INVENTOR(S) : David Joseph Easton It is certified that error appears in the above-indentified patent and that said Letters Patent is hereby corrected as shown below:

In the drawing, sole Figure, the reference numeral 60 should replace the reference numeral 50 which is applied to the lead line directed to the spring element at the top of valve 58.

Signed and Sealed this

Thirteenth Day of July, 1999

Q. TODD DICKINSON

Attest:

Attesting Officer

Acting Commissioner of Patents and Trademarks